US012293659B2

(12) United States Patent
Fox et al.

(10) Patent No.: US 12,293,659 B2
(45) Date of Patent: May 6, 2025

(54) COMPUTER ANALYSIS FOR ASSISTING THE OPERATIONS OF VEHICLES

(71) Applicant: International Business Machines Corporation, Armonk, NY (US)

(72) Inventors: Jeremy R. Fox, Georgetown, TX (US); Uri Kartoun, Cambridge, MA (US); Tushar Agrawal, West Fargo, ND (US); Sarbajit K. Rakshit, Rakshit (IN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 18/057,745

(22) Filed: Nov. 21, 2022

(65) Prior Publication Data

US 2024/0169830 A1    May 23, 2024

(51) Int. Cl.
| | |
|---|---|
| *G08G 1/08* | (2006.01) |
| *B60W 60/00* | (2020.01) |
| *G08G 1/0967* | (2006.01) |

(52) U.S. Cl.
CPC ............. *G08G 1/08* (2013.01); *B60W 60/001* (2020.02); *G08G 1/096716* (2013.01);
(Continued)

(58) Field of Classification Search
CPC .............. G08G 1/08; G08G 1/096716; G08G 1/096725; G08G 1/0112; G08G 1/0133; G08G 1/0145; G08G 1/096741; G08G 1/096775; B60W 60/001; B60W 2552/10; B60W 2554/4041; B60W 2554/4042; B60W 2555/60
See application file for complete search history.

(56) References Cited

U.S. PATENT DOCUMENTS

| | | |
|---|---|---|
| 8,903,593 B1 | 12/2014 | Addepalli |
| 9,940,840 B1 * | 4/2018 | Schubert ................ G06Q 30/06 |

(Continued)

FOREIGN PATENT DOCUMENTS

EP    3945478 A1    2/2022

OTHER PUBLICATIONS

Disclosed Anonymously, "Method and System for Smart Road Distributed Computing to Control Driving with Updated Software Amelioration", An IP.com Prior Art Database Technical Disclosure, IP.com No. IPCOM000270245D, IP.com Electronic Publication Date: Jun. 20, 2022, 6 pages.

(Continued)

*Primary Examiner* — Ashley L Redhead, Jr.
(74) *Attorney, Agent, or Firm* — Joseph P. Curcuru

(57) ABSTRACT

In an approach to improve the management of operating vehicles through smart contracts, embodiments generate a priority score based on received sensor feeds from a vehicle, co-located vehicles, and a smart contract rule. Further, embodiments assign the priority score to the vehicle and the co-located vehicles and the co-located vehicles and identify that the assigned priority score of the vehicle is higher than the co-located vehicles. Additionally, embodiments manage an operation of the co-located vehicles through a computing device within the co-located vehicles based on the smart contract rule and the priority score and create a priority lane for the vehicle by repositioning the co-located vehicles.

20 Claims, 4 Drawing Sheets

(52) U.S. Cl.
CPC ... *G08G 1/096725* (2013.01); *B60W 2552/10* (2020.02); *B60W 2554/4041* (2020.02); *B60W 2554/4042* (2020.02); *B60W 2555/60* (2020.02)

(56) References Cited

U.S. PATENT DOCUMENTS

| | | | |
|---|---|---|---|
| 10,223,134 B1 | 3/2019 | Penilla | |
| 10,753,754 B2 | 8/2020 | Delizio | |
| 10,896,606 B1* | 1/2021 | Hayes | G05D 1/0022 |
| 2019/0049994 A1* | 2/2019 | Pohl | G08G 1/166 |
| 2019/0236959 A1* | 8/2019 | Belapurkar | G08G 1/22 |
| 2020/0033887 A1* | 1/2020 | Kim | H04W 12/10 |
| 2020/0080853 A1* | 3/2020 | Tam | G08G 1/22 |
| 2020/0159251 A1* | 5/2020 | Iwasaki | B60R 16/037 |
| 2020/0166950 A1* | 5/2020 | Hase | G05D 1/0088 |
| 2020/0193813 A1* | 6/2020 | Sui | G08G 1/0116 |
| 2020/0200547 A1* | 6/2020 | Miller | G01C 21/3815 |
| 2020/0365015 A1* | 11/2020 | Nguyen | G08G 1/0129 |
| 2021/0044969 A1 | 2/2021 | Cronie | |
| 2021/0056854 A1* | 2/2021 | Ucar | G05D 1/0295 |
| 2021/0148717 A1* | 5/2021 | Atanasiu | G01C 21/3407 |
| 2021/0150429 A1* | 5/2021 | Atanasiu | G01C 21/3469 |
| 2021/0188273 A1* | 6/2021 | Katriniok | G08G 1/161 |
| 2021/0201674 A1* | 7/2021 | Oyama | G08G 1/207 |
| 2021/0215506 A1* | 7/2021 | Wiesenberg | G01M 17/007 |
| 2021/0295698 A1* | 9/2021 | Shimamoto | G08G 1/146 |
| 2021/0295699 A1* | 9/2021 | Shimamoto | G08G 1/148 |
| 2022/0089237 A1* | 3/2022 | Sverdlov | B25J 9/1697 |
| 2022/0348227 A1* | 11/2022 | Foster | G06V 20/588 |
| 2024/0132109 A1* | 4/2024 | Zhang | G08G 1/096816 |

OTHER PUBLICATIONS

Disclosed Anonymously, "System and Method to Adapt Roadway Infrastructure Signals, Signs and Lanes For Emergency/Authorized Vehicles", An IP.com Prior Art Database Technical Disclosure, IP.com No. IPCOM000255480D, IP.com Electronic Publication Date: Sep. 27, 2018, 3 pages, <https://priorart.ip.com/IPCOM/000255480>.

McLellan, Charles, "What is V2X communication? Creating connectivity for the autonomous car era", ZD Net, Nov. 4, 2019, 17 pages, <https://www.zdnet.com/home-and-office/networking/what-is-v2x-communication-creating-connectivity-for-the-autonomous-car-era/>.

Purkayastha, Shyam, "Smart Traffic Management System for Emergency Services", IBM Cloud blog, Nov. 19, 2015, 4 pages, <https://www.ibm.com/blogs/cloud-archive/2015/11/pubnub-smart-traffic-management-system-for-emergency-services/>.

"IBM IoT Connected Vehicle Insights", retrieved from https://www.ibm.com/products/iot-for-automotive, Nov. 28, 2020, 5 pages, https://web.archive.org/web/20201128110143/https://www.ibm.com/products/iot-for-automotive.

"Smart City Technology Revolutionizes Infrastructure", retrieved from https://www.ibm.com/industries/government/infrastructure-citizen-services, Oct. 10, 2022, 5 pages, https://web.archive.org/web/20221010043047/https://www.ibm.com/industries/government/infrastructure-citizen-services.

* cited by examiner

COMPUTER ANALYSIS FOR ASSISTING THE OPERATIONS OF VEHICLES

BACKGROUND OF THE INVENTION

The present invention relates generally to autonomous vehicles, and more particularly to the field of computer-generated assistance for an operator of a motor vehicles.

Autonomous vehicle (e.g., autonomous car) is a mode of transportation incorporating driving automation (e.g., vehicular automation), that is, a ground vehicle that is capable of sensing its environment and moving safely with little or no human input. Self-driving cars combine a variety of sensors to perceive their surroundings, such as thermographic cameras, radar, lidar, sonar, GPS, odometry and inertial measurement units. Advanced control systems interpret sensory information to identify appropriate navigation paths, as well as obstacles and relevant signage. Control methods based on Artificial Intelligence can then be used to learn all the gathered sensory information in order to control the vehicle and support various autonomous-driving tasks. As a future technology, they are predicted to have a comprehensive impact on automobile industry, health, welfare, urban planning, traffic, insurance, labor market and other fields. Autonomous vehicles are fluent in making driving decisions based on the captured information of the surrounding area, that includes image and video feeds, various scanning information, IoT feed, etc. There can be different types of accidents with an autonomous vehicle, like collision from the front, backside, etc.; in this case, the autonomous vehicle can take appropriate action to avoid accidents.

SUMMARY

Embodiments of the present invention disclose a computer-implemented method, a computer program product, and a system, for rule-based management of vehicle operations, the computer-implemented method comprising: generating a priority score based on received sensor feeds from a vehicle, co-located vehicles, and a smart contract rule; assigning the priority score to the vehicle and the co-located vehicles and the co-located vehicles; identifying that the assigned priority score of the vehicle is higher than the co-located vehicles; managing an operation of the co-located vehicles through a computing device within the co-located vehicles based on the smart contract rule and the priority score; and creating a priority lane for the vehicle by repositioning the co-located vehicles.

DETAILED DESCRIPTION

Figure 1:
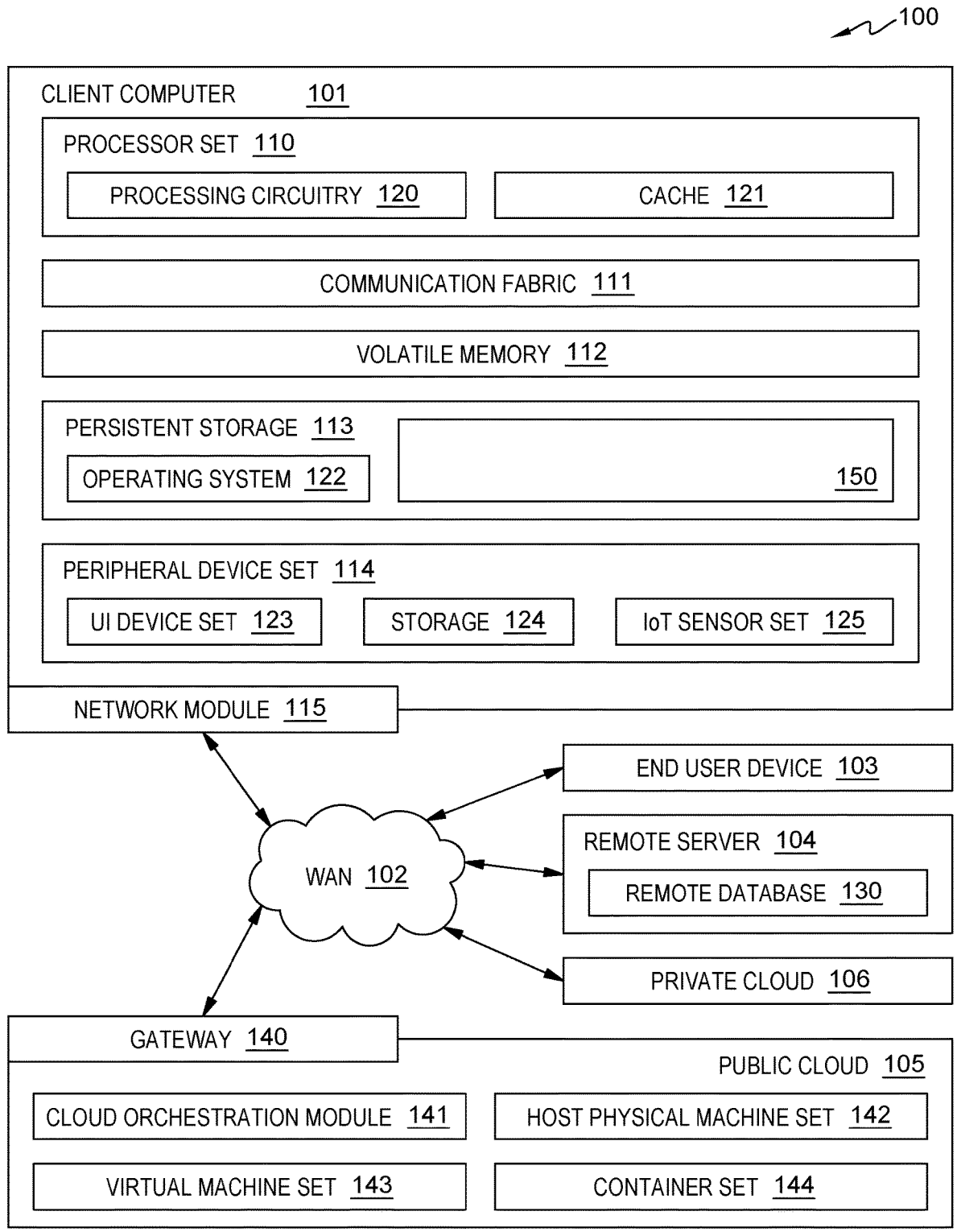
FIG. 1 is a functional block diagram illustrating a distributed data processing environment, executing a rule-based vehicle management program, in accordance with an embodiment of the present invention.

Embodiments of the present invention recognize that driving tasks may vary by importance based on changes in a contextual situation. For example, a vehicle that delivers food items requires refrigeration may be associated with a higher importance when compared to a vehicle used to transport individuals to a resort. Another example is an ambulance traveling to an emergency area having a higher priority on the road when compared to an individual driving home from work. In another example, an ambulance just driving to lunch versus the same ambulance responding to an emergency or heading to the hospital. Therefore, embodiments of the present invention recognize that the importance of the vehicle can be changed dynamically based on the contextual situation.

Embodiments of the present invention recognize that, currently, autonomous vehicles are not sufficiently equipped with the functionality to allow context-aware vehicle importance regarding navigation efficiency. Embodiments of the present invention improve the art and solve at least the problem(s) stated above by associating different autonomous vehicle tasks with different levels of importance based on a change in the contextual situation. More specifically, embodiments of the present invention improve the art and solve the at least the problem(s) stated above by using one or more smart contract rules to (i) analyze the internet of things (IoT) feeds received from co-located smart/autonomous vehicles to evaluate comparative importance, (ii) assign a level of importance to different vehicles to navigate through traffic, (iii) reposition the vehicles in accordance with the assigned levels (e.g., calculated scores), (iv) control autonomously driving vehicles and/or generate and display signals to the manually driven vehicle via alerts to the driver that instruct the driver where to move or how to position avoid the creation of an obstruction for moving traffic (e.g., priority vehicle(s)), (v) learn the priority of the vehicles based a contextual situation (e.g., if the vehicles miss their target destination in the stipulated amount of time then embodiments of the present invention re-evaluate based on the smart contract rule and predict the priority proactively), and (vi) dynamically adjust the priority of the vehicles.

Implementation of embodiments of the invention may take a variety of forms, and exemplary implementation details are discussed subsequently with reference to the Figures (i.e., FIG. 1-FIG. 4).

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails, and texts, and/or responsive display prompts begin with a written notification that the user's information may be recorded or monitored and may be saved, for the purpose of consolidating shipments to reduce carbon emissions and shipping costs. These embodiments may also include periodic reminders of such recording and monitoring throughout the course of any such use. Certain embodiments may also include regular (e.g., daily, weekly, monthly) reminders to the participating parties that they have consented to being recorded and monitored for rule-based vehicle management and may provide the participating parties with the opportunity to opt-out of such recording and monitoring if desired.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as rule-based vehicle management program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may utilize one or more smart contract rules to evaluate the comparative importance of co-located vehicles (both autonomous and manually operated) while a vehicle and co-located vehicles are operating (e.g., driving on a road or highway). In various embodiments, the comparative importance of the co-located vehicles is based on the type of vehicle, traffic conditions, road capacity, pre-scheduled events (e.g., sporting events, and national or local holidays), and/or time of day (e.g., rush hour), wherein component 150 selectively assigns a level of importance to each vehicle that has selected to opt-in. Component 150 may coordinate the movement of vehicles based on the assigned level of importance by generating and outputting instructions on how the vehicles should maneuver based on the assigned level of importance of one or more vehicles. For example, an ambulance would receive a high level of importance and a normal passenger car would receive a low level of importance, wherein component 150 would instruct the normal passenger car to move to the side of the road so the ambulance can pass and lead the traffic.

Component 150, via IoT sensor set 125, receives IoT feeds from one or more co-located vehicles, and calculates, based on one or more smart contract rules, the comparative priority score for a vehicle. In various embodiments, based on the calculated comparative priority score (priority score), component 150 identifies how the vehicles will reposition on the road so that the comparative importance vehicle can reach a predetermined destination in an efficient manner while considering driving safety standards. Component 150 may utilize various factors when calculating the priority score, wherein the various factors may be predetermined and based on driving context. For example, if a driver has food that can get spoiled if not delivered on time it takes a higher priority over a driver commuting to an amusement park. In this example, the priority of the vehicle changes time to time. For instance, the delivery vehicle will reduce in priority once the food is delivered. In another example, if there are multiple emergency vehicles, the emergency with a more critical or life-threatening condition takes the higher priority over the emergency vehicle transporting a more stable or non-life-threatening or a tow truck going to help clear a traffic accident.

In various embodiments, component 150 may utilize the location, weather, type of vehicle, traffic conditions, purpose of the vehicle, responsibilities being performed, unique identification number, target destination, and objects, items, and/or individuals being transported to calculate the priority score. In some embodiments, the unique identification number indicates the type of vehicle (e.g., emergency vehicle, government vehicle, delivery truck, etc.), manufacturer, and/or any other identifying data known and understood in the art. In various embodiments, component 150 identifies a predetermined destination of a vehicle from historic metadata (e.g., previous routes taken and/or routes taken during the same time weekly or daily), a location entered into a global positioning system (GPS), and/or a unique identifier that is assigned to emergency and first responder vehicles. A unique identifier can detail the duties, responsibilities, and/or assigned tasks that a vehicle is currently performing.

Component 150 may control and manage the traffic light system based on one or more smart contract rules, the assigned comparative priority score of vehicles on the road, and the intersections or route the vehicles with high priority scores are traveling. For example, the smart contract rule is that an emergency vehicle is higher priority than a non-emergency vehicle. However, this is just a simplified example. In various embodiments, component 150 manages the traffic light system to enable vehicles with high priority scores to reach a predetermined destination more efficiently (e.g., in a more rapid time). For example, changing the traffic lights on the road that an ambulance is traveling on to green and changing the cross-traffic streetlights to red. Component 150 may dynamically take control of a manually driven vehicle with autonomous driving capabilities. In various embodiments, if a vehicle with autonomous driving capabilities is being driven manually then based on an assigned comparative priority score, component 150 dynamically takes control of the vehicle and autonomously drives the vehicle to a predetermined destination. Component 150 may coordinate the driving route with the streetlight system and managed traffic to reduce or eliminate traffic barriers and create a streamlined route for one or more vehicles with high priority scores.

Component 150, based on historic data in a knowledge corpus, may proactively predict which active vehicle will be assigned a comparative priority score and label the predicted vehicle(s) as a target vehicle(s), wherein component 150 may proactively identify the target vehicle(s) and assigns the target vehicle(s) a comparative priority score based on the smart contract rule. Component 150 may auto evolve the one or more smart contract rules for the vehicle, based on historic evaluations of assigned comparative priority scores of a vehicle, and stored data regarding the timeliness of the vehicle reaching a predetermined destination. In various embodiments, so vehicles, such as emergency vehicles, possess an option to force component 150 to auto-assign the vehicle a high priority score or a predetermined top priority labeling that pushes the vehicle to the top of the priority list/rank.

In various embodiments, component 150 utilizes a smart contract rule to analyze IoT feeds received from co-located vehicles to evaluate a comparative importance the vehicles traveling within a predetermined radius of proximity. Component 150 may assign a level of importance to each of the vehicles traveling within a predetermined radius of proximity (e.g., driving next to each other in traffic or on the road), and reposition the vehicles in accordance with the assigned levels.

Figure 2:
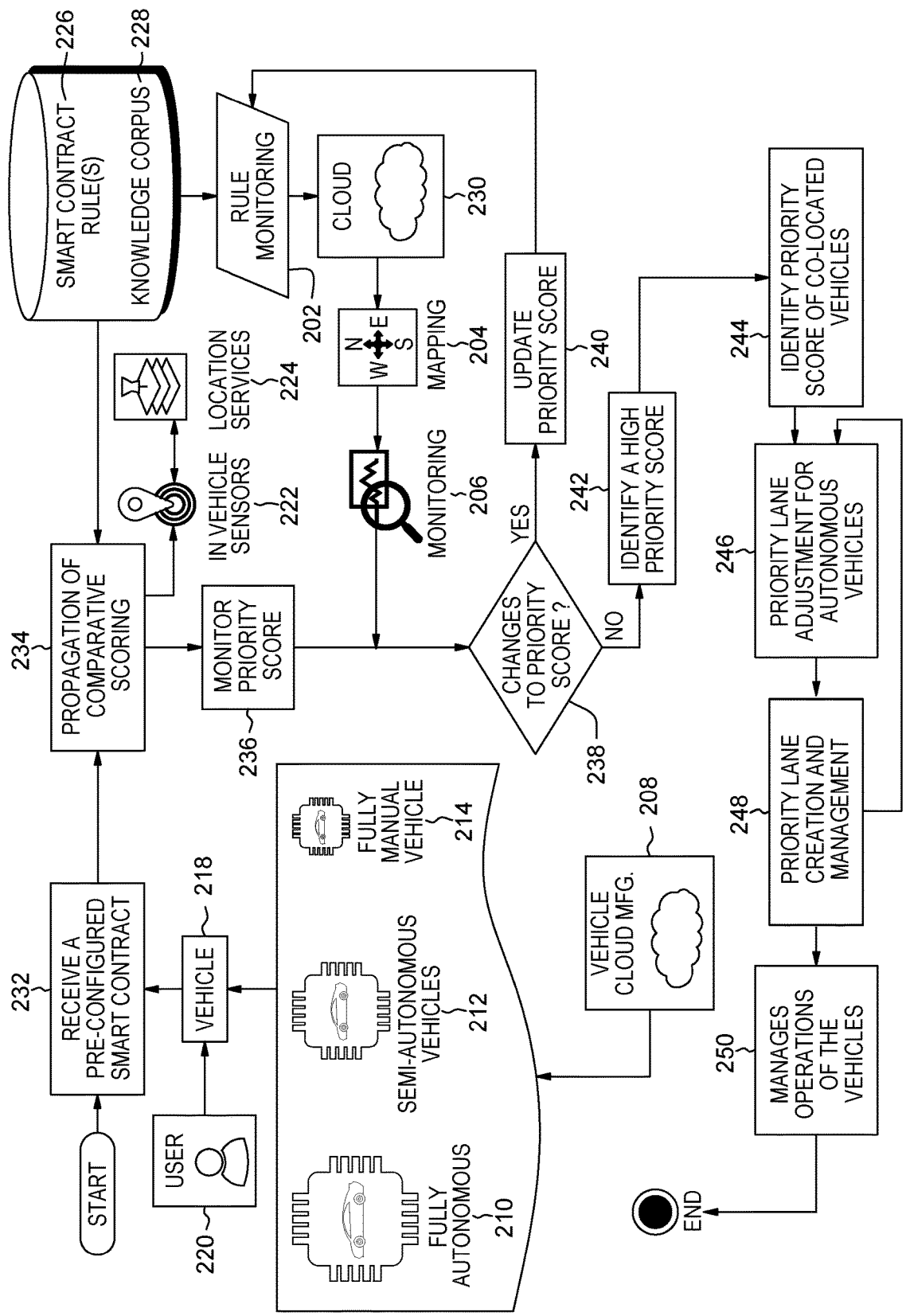
FIG. 2 illustrates operational steps of the rule-based vehicle management program, on a server computer within the distributed data processing environment of FIGS. 1, in accordance with an embodiment of the present invention.

FIG. 2 illustrates operational steps of component 150, generally designated 200, in communication with client computer 101, remote server 104, private cloud 106, EUD 103, and/or public cloud 105, within distributed data processing environment 100, for implementing rule-based management of vehicles, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 receives a pre-configured smart contract rule definition (step 232). In various embodiments, component 150 receives one or more smart contract rules for selectively assigning a priority score to active vehicles on the road based on IoT feeds from the active vehicles (e.g., vehicle 218) to component 150 through cloud 230, wherein cloud 230 may be a public cloud, a private cloud, or a hybrid cloud. Smart contract rule(s) 226 may be used to derive a comparative priority score for one or more vehicles and smart contract rule(s) 226 may be stored on cloud 230, knowledge corpus 228, and/or a local database. In the depicted embodiment, smart contract rule(s) are stored on knowledge corpus 228. In the depicted embodiment, component 150, via vehicle cloud manufacturing 208, generates multiple digital twins of vehicle 218 (i.e., fully autonomous vehicle 210, semi-autonomous vehicle 212, fully manual vehicle 214). fully autonomous vehicle 210 is a digital twin relating to vehicle 218 operating fully autonomously, semi-autonomous vehicle 212 is a digital twin refereeing to vehicle 212 that operates semi-autonomously, and fully manual vehicle 214 is a digital twin of vehicle 216 that can only be operated manually. In the depicted embodiment, cloud 230 receives data associated with vehicle 218 from in vehicle sensors (sensors 222). In various embodiments, user 220 operates or rides within vehicle 218.

In the depicted embodiment, component 150 executes a propagation of comparative scoring on vehicles that have opted-in (step 234). Component 150 may identify sensors 222 and identify the type of sensor that sensors 222 are. In various embodiments component 150 identifies sensors 222 and any other sensors present in vehicle 218 (e.g., wearable IoT devices, smart phones, etc.) and collects data from identified sensors within or on vehicle 218. In various embodiments, cloud 230 receives data from sensors 222 of each vehicle that is operating. Cloud 230, via location services 224 and/or GPS, may identify the physical location of vehicle 218 and each co-located vehicle. In various embodiments, component 150 identifies parameters of vehicle 218 and analyzes conduct of vehicle 218. Component 150 may analyze the received sensor data from vehicle 218 and identify one or more predetermined parameters of vehicle 218. Component 150 may perform inclusive sharing and planning of the destination of vehicle 218 and each vehicle that has opted-in by gathering the target destination of each vehicle, the current time, the current pace, the remaining time to reach the target destination, and/or any identified obstructions (e.g., weather forecast, road construction, identified emergency, national or local holiday, scheduled event, time of day, and currently identified traffic).

In various embodiments, component 150 derives the importance of vehicle 218 based on sensor feed analysis of the collected sensor data, the identified parameters, and smart contract rule(s) 226. Smart contract rule(s) 226 may comprise various conditions that enable the derivation of the important score of the vehicle. In various embodiments, based on the smart contract rule(s) 226, sensors 222, and location services 224, component 150 may identify the comparative importance and location of vehicle 218 and each vehicle in that has opt-in (e.g., co-located vehicles). Component 150 may allocate and assign the identified priority score to vehicle 218. In various embodiments, component 150 allocates and assigns the identified priority score to each vehicle, respectively.

In the depicted embodiment, based on smart contract rule(s) 226 and sensors 222, component 150 monitors the assigned priority score (step 236). In the depicted embodiment, component 150 determines if there is a change to the priority score (step 238). In the depicted embodiment, if component 150 determines there is a change in the priority score (Yes step) then component 150 proceeds to step 240. However, if component 150 determines there is no change to the priority score (No step) then component 150 advances to step 242.

Component 150 updates the priority score based on an identified change in from monitoring 206 of sensors 222, and mapping 204 (step 240). Component 150, via cloud 230, may update the priority score by analyzing the received data from sensors 222 and mapping 204 against monitoring rules 202 from smart contract rule(s) 226. Component 150 may perform iterative monitoring and a monitoring loop of vehicle 218 to dynamically adjust the assigned priority score. Component 150 may dynamically adjust the assigned priority score based on the received data, co-located vehicles, and smart contract rule(s). Mapping 204 and location services 224 are both location/directional inputs. Mapping 204 may consider the autonomous vehicle for updating the priority score as activities are getting completed, and location services 224 assist in determining the score by providing a location parameter to the vehicle.

In the depicted embodiment component 150 identifies that vehicle 218 has a high priority score (step 242). In the depicted embodiment, component 150 identifies and compares the priority score of vehicles co-located to vehicle 218 (step 244). In various embodiments, component 150 identifies road condition, traffic condition, road crossing, etc., from current IoT devices and historical learning, and identifies and compares the priority score of each vehicle. In various embodiments, responsive to identifying vehicle 218 is assigned a high priority score, component 150 identifies road condition, traffic condition, road crossing, etc., from current IoT devices and historical learning, and identifies and compares the priority score of vehicles that are on the same route and/or co-located to vehicle 218. Component 150 may determine if vehicle 218 can reach a predetermined location within a predetermined timeframe based on the identified road conditions, available routes to reach the predetermined target destination, traffic conditions, weather report, road crossing, time of day, scheduled events, and movement of co-located vehicles (collected referred to as route conditions).

In the depicted embodiment, component 150 executes priority lane adjustment for autonomous vehicles (step 246). Component 150, based on a vehicle assigned priority score, may identify which vehicles should maneuver to clear a path or let vehicle 218 lead (e.g., pull over to the side/merge into the far left or far right lane and/or increase or decrease speed with respect to local laws and regulations).

In the depicted embodiment, component 150 creates and manages a priority lane for vehicle 218 (a vehicle with an assigned high priority) based on the identified co-located vehicles that should maneuver to clear a path (step 248). Component 150 may identify how to coordinate and maneuver the co-located vehicles so vehicle 218 can travel on the predetermined route efficiently (i.e., accommodate the high priority scored vehicle). Component 150 may adjust one or more priority lanes based on the location of co-located vehicles on the route that vehicle 218 is traveling (i.e., identifies if one or more lanes need to be cleared) and autonomously allocate the co-located vehicles so vehicle 218 has a clear path to a predetermined target location.

In the depicted embodiment, component 150 manages the operation of co-located vehicles. Component 150 may manage vehicles based the assigned priority score by allocating vehicles co-located around vehicle 218 into different lanes, street, and/or routes. In various embodiments, component 150 allocates the lane and space around vehicle 218. Component 150 may identify which lane and the speed co-located vehicles and vehicle 218 should travel in based on the priority score of each vehicle. In various embodiments, component 150 may identify whether the vehicle is fully manual, partially autonomous, autonomous enabled, and/or fully autonomous. If component 150 identifies an autonomous enabled vehicle being operated manually, then component 150 will override the manual driver and autonomously operate the vehicle. Component 150 may change the vehicles speed, lane, and/or route of the vehicle to enable one or more vehicles with a high priority score to pass. In various embodiments, component 150, via a user interface, will issue a responsive prompt to user 220 that enables the user to select whether component 150 can override the manual operation (i.e., user 220 has an option to refuse or allow component 150 to autonomously operate vehicle 218). Component 150 may autonomously operate vehicle 218 in compliance with the smart contract(s) (i.e., smart contract rule(s) 226). In various embodiment, component 150 controls, via smart contract rule(s) 226, the wait time for co-located vehicle wait time at traffic lights. Component 150 may be equipped with a module that can identify false reporting (e.g., a passenger reporting as feeling sick, but has an intention to get to the movie theatre faster). In various embodiments, component 150 may enable group-based priority navigational changes based on weather data and weather application program interface (API) infusion.

Figure 3:
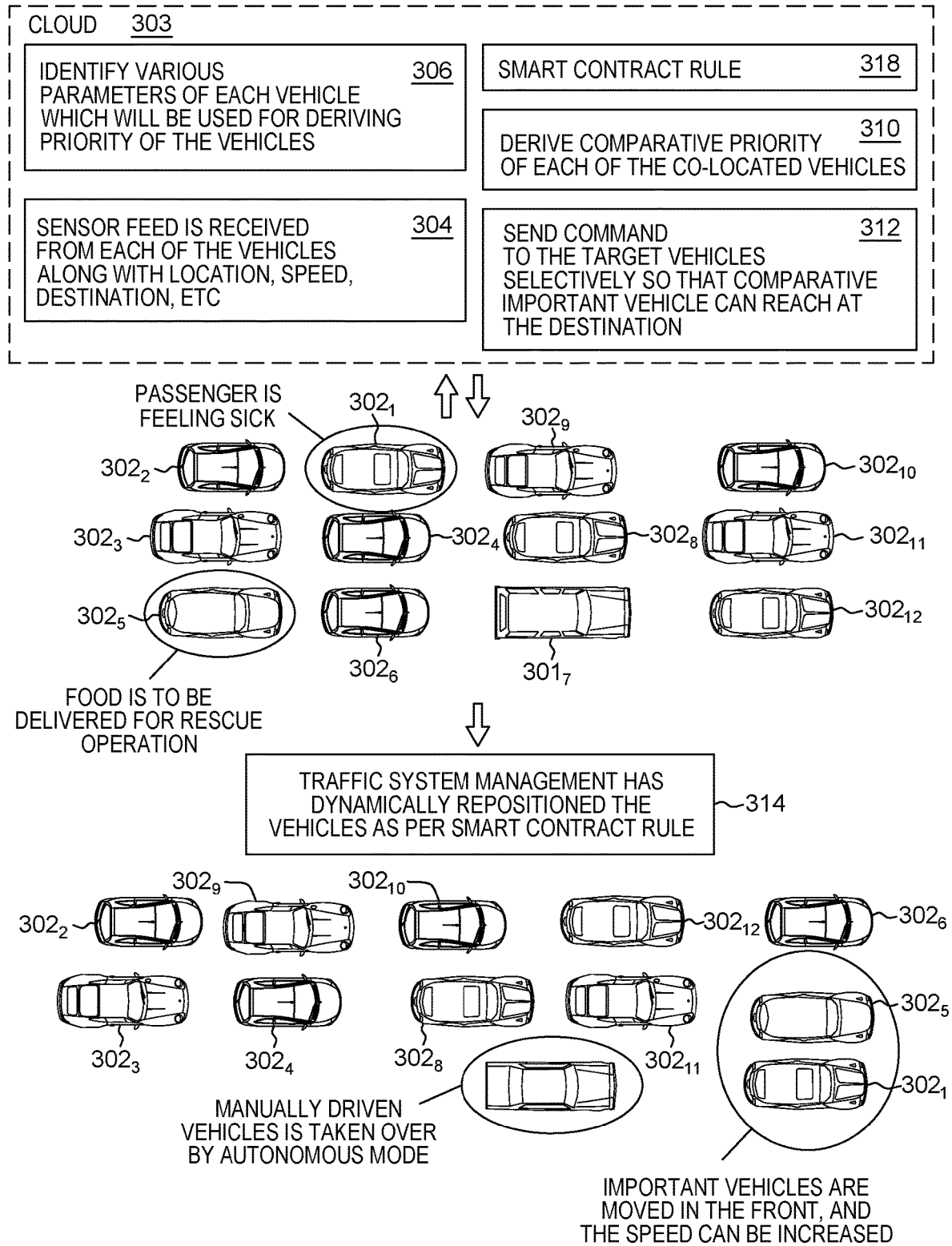
FIG. 3 illustrates one example of the rule-based vehicle management program, repositioning vehicles based on assigned priority scores, in accordance with an embodiment of the present invention.

FIG. 3 illustrates one example of the rule-based vehicle management program, repositioning vehicles based on assigned priority scores, in accordance with an embodiment of the present invention. In this example, component 150 analyzes the sensor feeds from vehicles $302_1$-$302_{12}$, collectively referred to as the vehicles, wherein based on the sensor feed analysis, component 150 identifies various parameters of the vehicles in compliance with smart contract rule 318. In various embodiments, component 150, based on smart contract rule 318, evaluates comparative priority scores of the vehicles, wherein component 150, via the smart contract rule(s), manage the traffic. For example, in FIG. 3, a passenger in vehicle $302_1$ is feeling ill and alerts component 150. A passenger may alert component 150 by initiating a command via a user interface or component 150 may be alerted based on biometrics, option control in the autonomous vehicle or a wearable IoT device, behavior analysis of the driver or passenger by the autonomous vehicle, user's speech translation, and/or any other form of communicating or indicating an alert known and understood in the art. Additionally, component 150 has been pre-alerted that vehicle $302_5$ is an emergency vehicle being delivered for a rescue operation. In this example, component 150, via cloud 303, receives sensor feeds from the vehicles that comprise the location, speed, autonomous operation capability, current route of travel, and destination of the vehicles (304).

Further, component 150 identifies predetermined parameters of the vehicles from the received senor feeds (306) and derives a comparative priority score for the vehicles (310) based on smart contract rule 318. Component 150 identifies, based on the received senor feedback and vehicle parameters, that vehicle $302_7$ has fully autonomous operating capability; however, it is currently being driven manually. In this example, component 150 issues specific commands to the vehicles (312) so that vehicle $302_1$ and vehicle $302_5$ lead the traffic and reach their target destination. Additionally, component 150 commands and manages the traffic light system. In this example, component 150 dynamical repositions the vehicles, based on smart contract rule 318 and the priority score of the co-located vehicles, (314) so vehicle $302_1$ and vehicle $302_5$ lead the traffic. As shown in the present example, component issues commands to manual drivers that instruct to manual drives where and how to maneuver and/or autonomously controls the movement of a vehicle (i.e., overriding manual operation and operating the vehicle autonomously) like that of vehicle $302_7$. Therefore, component 150 manages the movement of vehicles $302_1$-$302_{12}$ through issued commands and autonomous operation so that vehicle $302_1$ and vehicle $302_5$ lead the traffic.

In the depicted embodiment, the example comprises vehicles $302_1$-$302_{12}$; however, the example may comprise vehicles $302_1$-$302_N$, where N represents a positive integer, and accordingly the number of scenarios implemented in a given embodiment of the present invention is not limited to those depicted in FIG. 3.

Figure 4:
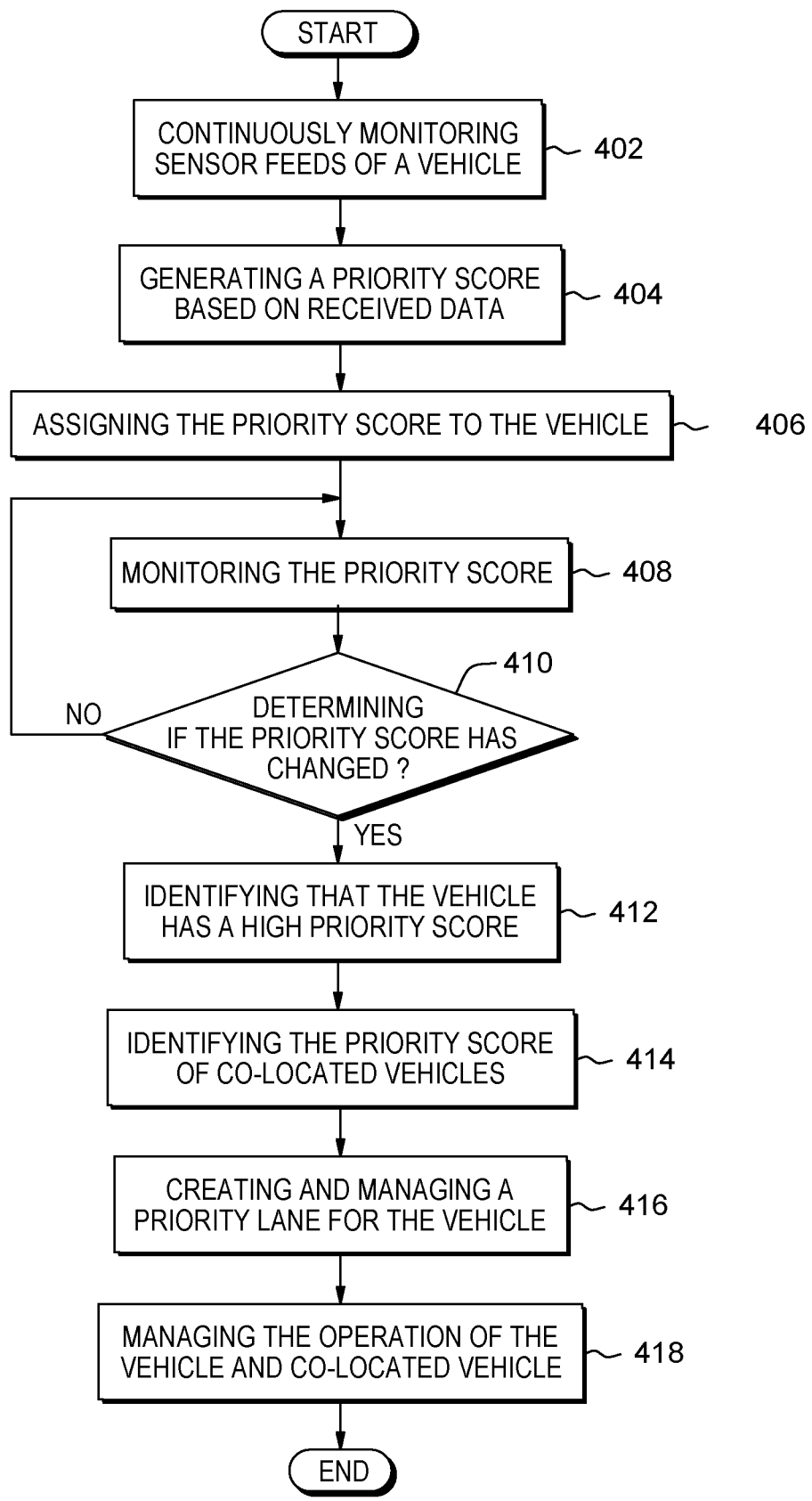
FIG. 4 illustrates operational steps of the rule-based vehicle management program, on a server computer within the distributed data processing environment of FIGS. 1, in accordance with an embodiment of the present invention.

FIG. 4 illustrates operational steps of component 150, generally designated 400, in communication with client computer 101, remote server 104, private cloud 106, EUD 103, and/or public cloud 105, within distributed data processing environment 100, or implementing rule-based management of vehicle operations/movement, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 150 continuously monitors sensor feeds of a vehicle. In various embodiments continuously monitors the receive sensor feeds of one or more vehicles that have submitted permission to participate in the monitoring and traffic management (i.e., selected to opt-in).

In step 404, component 150 generates a priority score for the vehicle based on the received data and smart contract rules. In various embodiments, component 150 generates a priority score for the vehicle based on the received data from the sensor feeds, identified parameters, and smart contract rules. Component 150 may utilize various factors when calculating the priority score, wherein the various factors may be predetermined and based on driving context. For example, if a driver has food that can get spoiled if not delivered on time it takes a higher priority over a driver commuting to an amusement park. In this example, the priority of the vehicle changes time to time. For instance, the delivery vehicle will reduce in priority once the food is delivered.

In step 406, component 150 assigns the priority score to the vehicle. In various embodiments, component 150 assigns a priority score to each vehicle that has selected to opt-in and that is co-located to the vehicle. A co-located vehicle is the predetermined distance of one vehicle to another vehicle (e.g., surrounding vehicles). Component 150 may compare the assigned priority scores of the co-located vehicles and issue a comparative priority score.

In step 408, component 150 monitors the priority score. In various embodiments, component 150 monitors the assigned priority score, via sensor feeds, identified parameters, and smart contract rules. In various embodiments, component 150 continuously monitors the assigned priority score(s) for changes.

In step 410, component 150 determines if the priority score has changed. In the depicted embodiment, if component 150 determines the priority score has changed (Yes step) then component 150 advances to step 412. However, in the depicted embodiment, if component 150 determines there is not change to the assigned priority score (No step) then component 150 repeats step 408. In various embodiments, if a vehicle has completed the requirements or assigned tasks that were integral in determining the priority then the assigned priority score will adjust (e.g., lower). For example, when a food delivery truck delivers the food that was susceptible to spoilage (e.g., frozen meat) or an ambulance reaches the hospital the lower score for priority food delivery truck and ambulance will lower. Conversely, in a different example, if the ambulance receives another emergency call then the priority score for the ambulance will increase.

In step 412, component 150 identifies that the vehicle has a high priority score. In various embodiments, responsive to identifying vehicle 218 is assigned a high priority score, component 150 identifies road condition, traffic condition, road crossing, etc., from current IoT devices and historical learning, and identifies and compares the priority score of vehicles that are on the same route and/or co-located to a vehicle. Component 150 may determine if the vehicle can reach a predetermined location within a predetermined timeframe based on the identified road conditions, available routes to reach the predetermined target destination, traffic conditions, weather report, road crossing, time of day, scheduled events, and movement of co-located vehicles (collected referred to as route conditions).

In step 414, component 150 identifies the priority score of co-located vehicles. In various embodiments, component 150 identifies and compares the priority score of vehicles co-located to a vehicle. In various embodiments, component 150 identifies road condition, traffic condition, road crossing, etc., from current IoT devices and historical learning, and identifies and compares the priority score of each vehicle.

In step 416, component 150 creates and manages a priority lane for the vehicle. In various embodiments, component 150 creates and manages a priority lane for the vehicle based on the identified priority score of the co-located vehicles.

In step 418, component 150 manages the operation of the vehicle and co-located vehicle. In various embodiments, component 150 manages the operation of the vehicle and co-located vehicle by either issuing commands to manually driven vehicles and/or autonomously operating the vehicle and co-located vehicles so the vehicle can lead the co-located vehicles.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for rule-based management of vehicles, the computer-implemented method comprising:

generating priority scores based on received sensor feeds from a vehicle, co-located vehicles, and a smart contract rule;

assigning the priority scores to the vehicle and the co-located vehicles;

identifying that an assigned priority score of the vehicle is higher than the co-located vehicles;

managing an operation of the co-located vehicles through respective computing devices within the co-located vehicles based on the smart contract rule and the priority scores; and creating a priority lane for the vehicle by repositioning the co-located vehicles.

2. The computer-implemented method of claim 1, further comprising:

continuously monitoring sensor feeds of the vehicle; and
continuously monitoring the priority score of the vehicle and the co-located vehicles.

3. The computer-implemented method of claim 1, further comprising:

generating one or more display signals; and
displaying the one or more display signals to a manually driven vehicle within the co-located vehicles, wherein the one or more display signals alert a driver of the manually driven vehicle and instruct the driver of the manually driven vehicle where to move or how to position the manually driven vehicle to avoid obstructing the vehicle.

4. The computer-implemented method of claim 1, further comprising:

dynamically adjusting the priority score based on received data from the sensor feeds, one or more identified vehicle parameters, and the smart contract rule.

5. The computer-implemented method of claim 1, wherein managing the operation of the co-located vehicles comprises:

issuing commands to a manual driver that instruct the manual drive on where and how to maneuver; and
autonomously operating vehicles with autonomous operating capability.

6. The computer-implemented method of claim 1, wherein creating the priority lane comprises:

identifying a traffic lane and a speed of the co-located vehicles; and
allocating the co-located vehicles into different lanes, streets, or routes based on the priority score assigned to the co-located vehicles.

7. The computer-implemented method of claim 6, wherein creating the priority lane comprises:

controlling a traffic light system based on the smart contract rule to enable the vehicle to reach a predetermined target destination.

8. A computer system for rule-based management of vehicles, the computer system comprising:

one or more computer processors;
one or more computer readable storage devices;
program instructions stored on the one or more computer readable storage devices for execution by at least one of the one or more computer processors, the stored program instructions comprising:

program instructions to generate priority scores based on received sensor feeds from a vehicle, co-located vehicles, and a smart contract rule;

program instructions to assign the priority scores to the vehicle and the co-located vehicles;

program instructions to identify that an assigned priority score of the vehicle is higher than the co-located vehicles;

program instructions to manage an operation of the co-located vehicles through respective computing devices within the co-located vehicles based on the smart contract rule and the priority scores; and program instructions to create a priority lane for the vehicle by repositioning the co-located vehicles.

9. The computer system of claim 8, further comprising:
program instructions to continuously monitor sensor feeds of the vehicle; and
program instructions to continuously monitor the priority score of the vehicle and the co-located vehicles.

10. The computer system of claim 8, further comprising:
program instructions to generate one or more display signals; and
program instructions to display the one or more display signals to a manually driven vehicle within the co-located vehicles, wherein the one or more display signals alert a driver of the manually driven vehicle and instruct the driver of the manually driven vehicle where to move or how to position the manually driven vehicle to avoid obstructing the vehicle.

11. The computer system of claim 8, further comprising:
program instructions to dynamically adjust the priority score based on received data from the sensor feeds, one or more identified vehicle parameters, and the smart contract rule.

12. The computer system of claim 8, wherein managing the operation of the co-located vehicles comprises:
program instructions to issue commands to a manual driver that instruct the manual drive on where and how to maneuver; and
program instructions to autonomously operate vehicles with autonomous operating capability.

13. The computer system of claim 8, wherein creating the priority lane comprises:
program instructions to identify a traffic lane and a speed of the co-located vehicles; and
program instructions to allocate the co-located vehicles into different lanes, streets, or routes based on the priority score assigned to the co-located vehicles.

14. The computer system of claim 13, wherein creating the priority lane comprises:
program instructions to control a traffic light system based on the smart contract rule to enable the vehicle to reach a predetermined target destination.

15. A computer program product for rule-based management of vehicles, the computer program product comprising:
one or more computer readable storage devices and program instructions stored on the one or more computer readable storage devices, the stored program instructions comprising:

program instructions to generate priority scores based on received sensor feeds from a vehicle, co-located vehicles, and a smart contract rule;

program instructions to assign the priority scores to the vehicle and the co-located vehicles;

program instructions to identify that an assigned priority score of the vehicle is higher than the co-located vehicles;

program instructions to manage an operation of the co-located vehicles through respective computing devices within the co-located vehicles based on the smart contract rule and the priority scores; and program instructions to create a priority lane for the vehicle by repositioning the co-located vehicles.

16. The computer program product of claim 15, further comprising:
program instructions to continuously monitor sensor feeds of the vehicle; and
program instructions to continuously monitor the priority score of the vehicle and the co-located vehicles.

17. The computer program product of claim 15, further comprising:
program instructions to generate one or more display signals; and
program instructions to display the one or more display signals to a manually driven vehicle within the co-located vehicles, wherein the one or more display signals alert a driver of the manually driven vehicle and instruct the driver of the manually driven vehicle where to move or how to position the manually driven vehicle to avoid obstructing the vehicle.

18. The computer program product of claim 15, further comprising:
program instructions to dynamically adjust the priority score based on received data from the sensor feeds, one or more identified vehicle parameters, and the smart contract rule.

19. The computer program product of claim 15, wherein managing the operation of the co-located vehicles comprises:
program instructions to issue commands to a manual driver that instruct the manual drive on where and how to maneuver; and
program instructions to autonomously operate vehicles with autonomous operating capability.

20. The computer program product of claim 15, wherein creating the priority lane comprises:
program instructions to identify a traffic lane and a speed of the co-located vehicles;
program instructions to allocate the co-located vehicles into different lanes, streets, or routes based on the priority score assigned to the co-located vehicles; and
program instructions to control a traffic light system based on the smart contract rule to enable the vehicle to reach a predetermined target destination.

* * * * *